United States Patent [19]

Sumiya et al.

[11] Patent Number: 5,194,070
[45] Date of Patent: Mar. 16, 1993

[54] PROCESS FOR PRODUCTION OF DIAMOND ABRASIVE GRAINS

[75] Inventors: Hitoshi Sumiya; Kazuwo Tsuji, both of Itami, Japan

[73] Assignee: Sumitomo Electric Industries, Ltd., Osaka, Japan

[21] Appl. No.: 915,614

[22] Filed: Jul. 21, 1992

[30] Foreign Application Priority Data

Jul. 22, 1991 [JP] Japan .................................. 3-205442

[51] Int. Cl.$^5$ .............................................. B24D 3/00
[52] U.S. Cl. ...................................... 51/293; 51/298; 51/307; 51/309
[58] Field of Search .................. 51/293, 298, 309, 307

[56] References Cited

U.S. PATENT DOCUMENTS

| | | | |
|---|---|---|---|
| 4,919,974 | 4/1990 | McCune et al. | 51/293 |
| 5,104,420 | 4/1992 | Yoshida et al. | 51/293 |
| 5,133,332 | 7/1992 | Tanaka et al. | 51/293 |

FOREIGN PATENT DOCUMENTS 61-68395 8/1986 Japan .

*Primary Examiner*—Mark L. Bell
*Assistant Examiner*—Willie J. Thompson
*Attorney, Agent, or Firm*—Cushman, Darby & Cushman

[57] ABSTRACT

Diamond abrasive grains are produced by a process which comprises steps of: regularly arranging a plurality of diamond crystal seeds on a first metal solvent plate, stacking a second solvent metal plate on the first solvent metal plate so that the diamond crystal seeds are sandwiched by the first solvent metal plate and the second solvent metal plate, and stacking a graphite raw plate on the second solvent metal plate to construct a production system for the diamond abrasive grains, heating the system or heating the system with pressurizing to a temperature above a solvent metal-graphite eutectic point through a temperature and pressure condition in which diamond is thermodynamically unstable to establish a temperature and pressure condition in which diamond is thermodynamically unstable, and heating the system or heating the system with pressurizing to establish a temperature and pressure condition in which diamond is thermodynamically stable and maintaining said condition.

6 Claims, 2 Drawing Sheets

PROCESS FOR PRODUCTION OF DIAMOND ABRASIVE GRAINS

BACKGROUND OF THE INVENTION

1. Field of the Invention

The present invention relates to a process for the production of diamond abrasive grains with a high yield which have a relatively uniform size distribution, a high toughness and a high strength.

2. Description of the Related Art

Diamond abrasive grains are bonded by a metal or a resin and used for a grinding wheel, a cutter or a drill. In addition, they are nowadays used as a raw material of a diamond sintered tool for cutting for example aluminum alloy materials.

One process for the production of the diamond abrasive grains is a stacking process. In this process, a graphite plate as a raw material is stacked on a solvent metal plate which comprises at least one of Fe, Ni, Co and Mn to form a production system for the diamond abrasive grains, and then the system is kept under a condition of a temperature and a pressure in which diamond is thermodynamically stable so as to spontaneously generate nuclei at an interface between the graphite plate and the solvent metal plate and grow the nuclei to a desired size.

In the above stacking process, since the spontaneous nuclei are generated randomly with respect to a space and a time, the produced diamond grains have a wide distribution in their size. The resultant diamond grains should be sieved to select diamond grains having a size of 300–600 $\mu$m for the use as the abrasive grains. However, a yield of such suitable diamond grains is extremely small and thus, the process is not economically advantageous. In addition, due to the spontaneous nucleation, diamond grains growing from the nuclei interferes with one another resulting in generation of defects in the diamond grains, whereby it is very difficult to produce good diamond grains having a high toughness and a high strength.

In order to overcome the above problem of the stacking process, it has been proposed to provide diamond crystal seeds beforehand between the graphite raw plate and the metal solvent plate. For example, Japanese Patent Kokai Publication No. 68395/1986 discloses a production system in which diamond crystal seeds are placed in small holes regularly provided on a solvent metal plate, and a graphite raw plate is stacked on the metal plate. In the stacking process using the diamond crystal seeds, diamond grains having a desired size are produced in a higher yield than the usual stacking process in which the diamond crystal seeds are not used.

In the process using the diamond crystal seeds, it is difficult for a melted solvent metal to completely surround surfaces of the diamond crystal seeds in an initial term of crystal growth, and therefore many crystal seeds grow while the solvent metal and/or the graphite are included therein, so that the resultant diamond abrasive grains contain the inclusion. Such diamond grains which contain much inclusion are easily cracked because of a difference of a thermal expansion coefficient between the inclusion and the diamond crystal. Therefore, the diamond abrasive grains produced by the stacking process with the diamond crystal seeds have a less mechanical strength, especially a less impact strength than that of the diamond abrasive grains produced by the stacking process without the diamond crystal seeds.

In addition, in the stacking process with the diamond crystal seeds, during the system is kept under a condition in which diamond is thermodynamically stable, not only the diamond crystal seeds grow, but also spontaneous nuclei are generated as in the case of the usual stacking process without the diamond crystal seeds. Thus, these two kinds of crystals interfere with one another so that the produced diamond abrasive grains contain a lot of crystals of a low quality such as crystals having defect and crystals of intergrowth in which more than one crystals are bonded.

Since the spontaneous nucleation is accelerated when a distance between the arranged diamond crystal seeds are longer, it is desirable that the diamond crystal seeds are arranged regularly with a proper distance in order to prevent the spontaneous nucleation. However, the diamond crystal seeds tend to easily roll out of the holes during the construction of the production system, and thus keeping the diamond crystal seeds in position is difficult.

SUMMARY OF THE INVENTION

It is, therefore, an object of the present invention to provide a process for the production of diamond abrasive grains in which the diamond grains having a size of 200–850 $\mu$m are produced in a high yield by the stacking process using the diamond crystal seeds, and the resultant diamond grains have, in relative to the diamond grains produced by the prior art, less inclusion and less defect so that the diamond grains according to the present invention are tougher and stronger.

The above object of the present invention is achieved by a process for the production of diamond abrasive grains comprising steps of:

regularly arranging a plurality of diamond crystal seeds on a first metal solvent plate, stacking a second solvent metal plate on the first solvent metal plate so that the diamond crystal seeds are sandwiched by the first solvent plate metal and the second solvent metal plate, and stacking a graphite raw plate on the second solvent metal plate to construct a production system for the diamond abrasive grains, heating the system or heating the system with pressurizing to a temperature above a solvent metal-graphite eutectic point through a temperature and pressure condition in which diamond is thermodynamically unstable to establish a temperature and pressure condition in which diamond is thermodynamically unstable, and heating the system or heating the system with pressurizing to establish a temperature and pressure condition in which diamond is thermodynamically stable and maintaining said condition.

In order that the diamond crystal seeds are kept regularly arranged on the first solvent metal plate before heating the system, it is preferred that the diamond crystal seeds are placed on the first solvent metal plate on which a solution comprising an acrylic copolymer as a main component has been applied beforehand, and then the acrylic copolymer is decomposed by heating in a vacuum condition to form a solid carbon which bonds the diamond crystal seeds firmly to the first solvent metal plate.

DETAILED DESCRIPTION OF THE INVENTION

In the stacking process using the diamond crystal seeds, in general, the solvent metal is melted and surrounds surfaces of the diamond crystal seeds in an initial term of the process, both of the metal solvent and the graphite are melted at a temperature above the solvent metal-graphite melting point (eutectic point) to form a melt, and diamond is newly precipitated on the surfaces of the diamond crystal seeds through the thin film of the melt under the temperature and pressure condition in which diamond is thermodynamically stable.

On the contrary, in the prior art, since the graphite raw plate is directly contacted with the diamond crystal seeds under an ultra high pressure, it is not possible for the melted solvent metal to smoothly surround entire surfaces, especially surface portions contacting the graphite plate, of the diamond crystal seeds, whereby the inclusion is caused during an initial term of the crystal growth.

Figure 1:
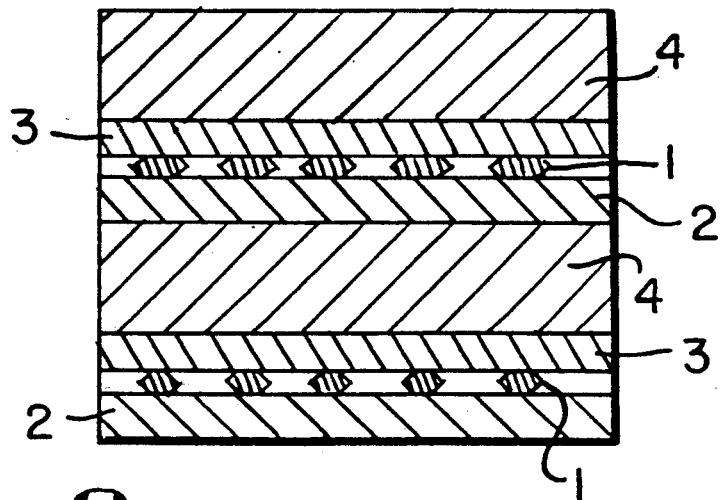
FIG. 1 schematically shows a cross sectional view of two production systems according to the present invention one of which is stacked on the other.

In the present invention, as shown in FIG. 1, the diamond crystal seeds 1 are sandwiched by the first solvent metal plate 2 and the second solvent metal plate 3, and the graphite raw plate 4 is stacked on the second solvent metal plate 3, whereby the melted solvent metal can go around the diamond crystal seeds and surround entire surfaces of the seeds so that the diamond crystal seeds smoothly grow with nearly no inclusion in the initial term of the crystal growth. An inclusion content in the diamond grains produced according to the present invention is less than that of the diamond grains of the prior art by one order. Thus, the present invention provides good diamond abrasive grains with a good mechanical strength.

When the production system for the diamond abrasive grains as described above is employed, a duration that the eutectic melt, which has been formed at the contact surface between the second solvent metal plate 3 and the graphite raw plate 4, reaches the diamond crystal seeds 1 is longer than the prior art. Therefore, there is a possibility that the diamond crystal seeds themselves may dissolve before the melt of the graphite and the solvent metals surrounds the crystal seeds 1. In order to eliminate such a possibility, a thickness of at least the second solvent metal plate 3 may be reduced. In the case in which usual diamond crystal seeds having a size of about 20-150 $\mu$m are used, it has been found that the thickness of the second solvent metal plate is preferably 50-150 $\mu$m, more preferably 50-100 $\mu$m to produce good diamond abrasive grains.

Generally, each of the solvent metal plates 2 and 3 comprises at least one of Fe, Ni, Co and Mn. However, both or either of these solvent metal plates may contain carbon, which allows fast formation of the eutectic melt so that the dissolution of the diamond crystal seeds 1 is prevented. A content of carbon in the solvent metal plate depends on a size of the diamond crystal seeds 1 to be used, and it is preferably near a saturated content. When the usual diamond crystal seeds having a size of about 20-150 $\mu$m are used, the content of carbon not less than 0.2% by weight, preferably not less than 0.3% by weight is sufficient. When the solvent metal contains carbon, there is no limitation of the thickness of the first and the second solvent metals 2 and 3 as described above. However, when the thickness is too large, the number of the production systems which can be stacked in a production vessel is reduced so that an overall yield is reduced. Thus, a suitable thickness of the metal plate is about 50-200 $\mu$m, preferably 50-150 $\mu$m. However, if the diamond crystal seeds have a size of not greater than 20 $\mu$m, the seeds may be easily dissolved even when the above process is employed.

Figure 2:
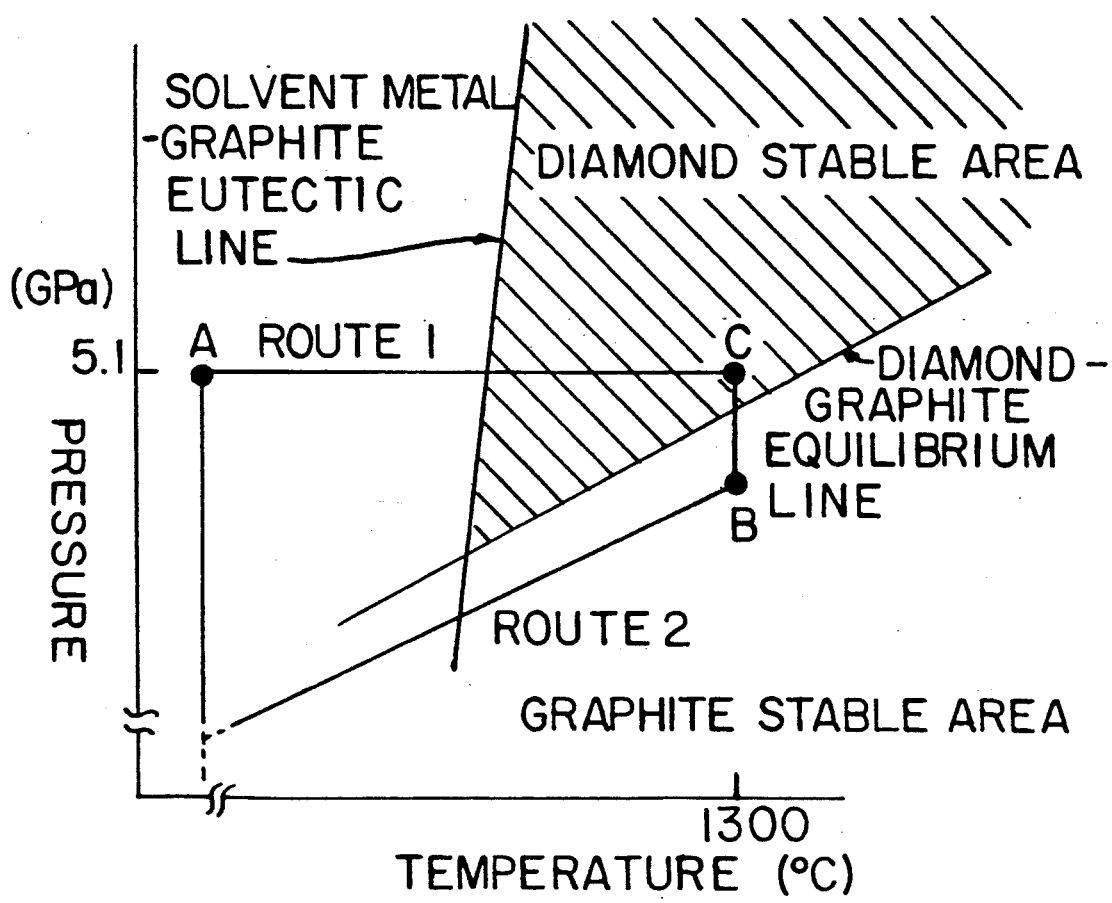
FIG. 2 is a graph schematically showing conditions of a temperature and a pressure when diamond grains are produced FIG. 3 schematically shows a cross sectional view in which a diamond crystal seed is bonded to a first solvent metal plate.

In order to prevent the spontaneous nucleation which adversely affects the growth of the diamond crystal seeds, production conditions of the present invention are different from those of the prior art. FIG. 2 shows the conditions of a temperature and a pressure on the production of the diamond grains.

The prior art takes Route 1 in which firstly a production system is pressurized to reach point A (for example, 5.1 GPa and room temperature), then the system is heated at a constant pressure (of for example 5.1 GPa) to a desired production temperature and then the system is kept at Point C under a desired temperature and a desired pressure (for example, 5.1 GPa and 1300° C.) for a desired period. In the case in which Route 1 is employed, when the system goes across a solvent metal-graphite eutectic line (or a melting point) on heating the system from A to C, the system necessarily goes into a hatched area in FIG. 2 in which diamond is thermodynamically stable, so that the nucleation arises between 3 and 4 or between 4 and 2 before the diamond crystal seeds 1 start to grow stably at a constant rate when the system reaches Point C of the desired temperature and pressure.

From view points as the above, the present invention employs Route 2. Namely, the system is heated or heated with pressurizing through a temperature and pressure condition in which diamond is thermodynamically unstable even when the system goes across the solvent metal-graphite eutectic line (or melting point), that is, through a condition in which graphite is stable so that the system reaches Point B (for example, 4.8 GPa and 1300° C.), and then the system is moved to Point C of the desired production temperature and the production pressure (for example, 5.1 GPa and 1300° C.) by heating the system or by heating the system with pressurizing. At Point C, the system is kept for a desired period. During keeping the system, a volume of the system is reduced since graphite is converted to diamond, whereby an inner pressure of the system is gradually reduced with a lapse of time. When the inner pressure is reduced, a growing rate of the diamond may be lowered. Thus, in the present invention, a load applied to the system is increased by about 15-20% based on an initial load during kept at Pint C to compensate the reduction of the inner pressure.

By taking the route 2, before diamond layers start to grow on surfaces of the diamond crystal seeds at a constant rate at the desired temperature and pressure, for example, at Point C, the temperature and the pressure are almost in the condition in which diamond is thermodynamically unstable, whereby the spontaneous nucleation is not caused even when the distance between the arranged diamond crystal seeds are large. Thus, no intergrowth or no skeletal crystal is produced due to the spontaneous nucleation, and the crystal grains growing from the diamond crystal seeds are not adversely affected, which provides good diamond abrasive grains with a high toughness and a high strength substantially without defect.

According to the present invention, substantially no spontaneous nucleation is caused. Thus, the diamond crystal seeds may be arranged with any long distance. However, in order to produce the diamond grains at a yield as large as possible, it is desirable that the seeds are arranged with a distance which is as closer to a size of the diamond grains to be produced as possible and also which does not cause contact between the diamond grains during their growth. The distance is usually 50–100 μm, preferably larger than a size of the grains to be produced.

As to a size (particle diameter) of the diamond crystal seeds, the seeds have the diameter which is enough not to disappear. From view points of an easy operation and a production cost, usually the seeds having the size of 20–150 μm are used. In the production of the diamond abrasive grains having the diameter of 300–600 μm which are mainly used in the industries, it has found that the diamond crystal seeds having the diameter of 37–105 μm provides good results.

When the diamond crystal seeds are arranged on the first solvent metal plate, the arrangement may be easily broken during the plate is handled. In order to ensure the arrangement until the production of the diamond grains, a following manner is useful: The diamond crystal seeds are regularly arranged on the first solvent metal plate on which an solution mainly comprising an acrylic copolymer has been applied beforehand, and then the plate is heated under a vacuum condition so that the acrylic copolymer is decomposed to form a solid carbon which bonds the diamond crystal seeds firmly to the first solvent metal plate. The solution preferably comprises about 40–60% by weight of the acrylic copolymer which is dissolved in a solvent such as water to have a viscosity of about 4000–5000 cps (centipoise). The solution is applied on the first solvent metal with a thickness of about 10–100 μm.

Figure 3:
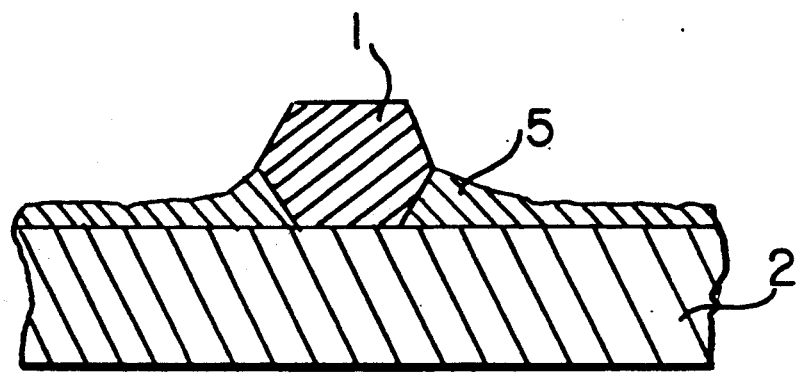

The acrylic copolymer is decomposed at a temperature of 400°–800° C. in the vacuum condition and the produced solid carbon 5 bonds the diamond crystal seed 1 to the first solvent metal plate 2 as shown in FIG. 3. The bonding is sufficient such that the diamond crystal seed 1 is not removed from the first solvent metal plate 2 during any operation thereafter, whereby the original regular arrangement is ensured.

EXAMPLE 1

Figure 4:
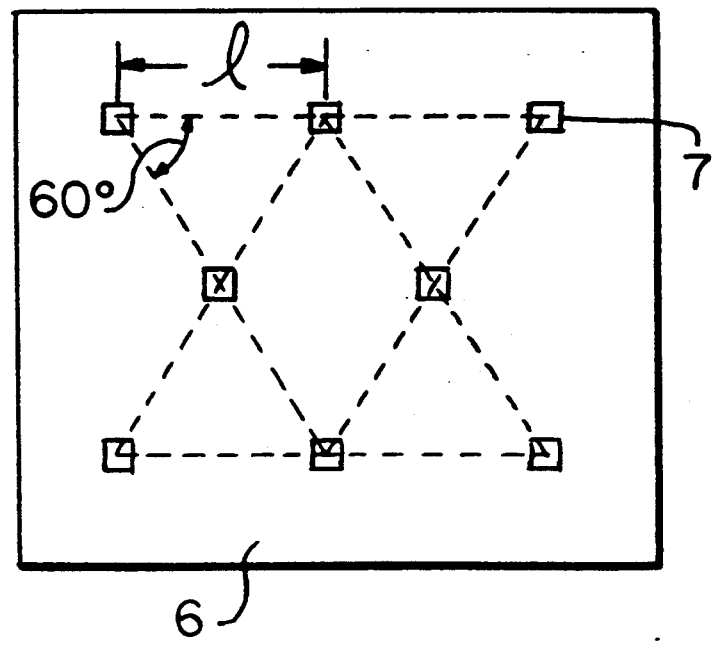
FIG. 4 schematically shows one example of a patterned mask which is used to regularly arrange diamond crystal seeds.

An aqueous solution having a viscosity of about 4500 cps which comprised 49% by weight of an acrylic copolymer (a commercially available usual adhesive) was applied with a thickness of about 50 μm on a first solvent metal plate of a Fe-42Ni alloy having a diameter of 22 mm and a thickness of 100 μm. Using a metal patterned mask 6 as shown in FIG. 4 having an opening 7 at each apex of an equilateral triangle of which side (1) is 500 82 m, crystal diamond seeds having a diameter of 37–44 μm were regularly arranged on the first solvent metal plate, and then the arrangement was heated to bond the seeds to the plate in a vacuum pressure of $10^{-2}$ torr at a temperature of 600° C. for one hour. A second solvent metal plate of the Fe-42Ni alloy having a diameter of 22 mm and a thickness of 50 μm was stacked on the diamond crystal seeds which were bonded to the first solvent metal plate, and a graphite raw plate having a diameter of 22 mm and a thickness of 0.5 mm was stacked on the second solvent metal plate to construct one production system for the diamond abrasive grains according to the present invention.

Twenty production systems were prepared and stacked one on the other in a production vessel which provides an ultra high pressure and a high temperature and subjected under the temperature and pressure condition of the route 2 in FIG. 2. Namely, the production systems were heated with gradually pressurizing over about five minutes so as to bring them to Point B (a pressure of 4.2 GPa and a temperature of 1300° C.), and kept at Point B for one minute to make a temperature distribution uniform, and then the systems were pressurized over about three minutes while the temperature was kept at 1300° C. so that the systems were moved to Point C of the pressure of 5.1 GPa (an equilibrium pressure was estimated to be 5.0 GPa). The systems were kept at Point C for 25 minutes with compensating reduction of an inner pressure of the systems, and then the production for the diamond grains was finished.

Then, after reducing the pressure and the temperature, all the systems were taken out of the vessel, and the diamond crystal grains were recovered by a gravity separation followed by an acid treatment. A total weight of the resultant diamond grains was 3.2 g. A fraction of required diamond grains having a diameter of 300–420 μm was 72% most of which were good crystal grains having a well-grown crystal surface with little defect.

In order to evaluate an impact strength of the resultant good diamond grains having a diameter of 300–420 μm, the grains (total weight of 400 mg) were vibrated with a frequency of 2400 cycles/min. for 50 seconds together with steel balls having a diameter of 6.4 mm in a steel cylindrical vessel having an inner volume of 30 cc, and a weight of diamond grains which were not broken was measured. A percentage by weight of the non-broken grains to the original grains (which is referred to as a room temperature (R.T.) toughness) was 83. After the same sample grains were heated to 1100° C., a toughness was evaluated (which is referred to as a high temperature (H.T.) toughness) in the same manner as described above. In addition, an inclusion content in the resultant crystal grains was also measured with chemical analysis and found to be 0.02% by weight.

COMPARATIVE EXAMPLE 1

Example 1 was repeated except that the diamond crystal seeds and the second solvent metal plate were not employed. Namely, the system consisted essentially of the first solvent metal plate and the graphite raw plate. The total weight of the diamond grains obtained in this Comparative Example (the stacking process without the diamond crystal seeds) was only 1.8 g and the fraction of the required diamond grains having a diameter of 300–420 μm was 43%. The resultant diamond grains had a wide distribution of their size and a lot of skeletal crystal and intergrowth crystal were contained therein. The toughnesses of the diamond grains were evaluated as in Example 1. The room temperature toughness was 71, and the high temperature toughness was 56. The inclusion content was 0.2% by weight.

COMPARATIVE EXAMPLE 2

The same production systems as in Example 1 were used except that the second solvent metal plate was not used in each system. The total weight of the diamond obtained in this Comparative Example 2 (the stacking process with the diamond crystal seeds) was 3.0 g. The fraction of the required diamond grains having a diameter of 300–420 μm was 58% and the inclusion content was 0.4% by weight. A lot of asymmetry diamond grains were also observed. The toughnesses of the diamond grains were evaluated as in Example 1. The room temperature toughness was 78, and the high temperature toughness was 45.

The results of the above Example 1, Comparative Example 1 and Comparative Example 2 are summarized in following table 1.

TABLE 1

| Process | R.T. Toughness | H.T. Toughness | Reduction Ratio of Toughness (%) | Inclusion Content (wt %) |
| --- | --- | --- | --- | --- |
| Example 1 | 83 | 83 | 0 | 0.02 |
| Com. Example 1 | 71 | 56 | 21 | 0.2 |
| Com. Example 2 | 78 | 45 | 42 | 0.4 |

COMPARATIVE EXAMPLE 3

The production systems were the same as in Example 1, but Route 1 in FIG. 2 was employed for the production of the diamond grains. The systems was moved to Point A (5.1 GPa) by only pressurizing without heating, and then the systems were heated to 1300° C. while the pressure was kept constant. Then, the systems were kept at Point C (pressure 5.1 GPa, temperature 1300° C.) for 25 minuets with compensating the reduction of the inner pressure of the systems and then the production of the diamond grains was finished.

Most of the resultant diamond grains were the skeletal crystal grains and the intergrowth crystal grains which were derived not from the crystal seeds but from the spontaneous nucleation. Most of the diamond crystal grains which grew from the crystal seeds were interfered with the skeletal crystal grains and the intergrowth crystal grains, so that they also had a bad quality with much defect. There is substantially no diamond grain having a good quality with the well-grown surface.

EXAMPLE 2

Example 1 was repeated except that the second solvent metal plate had the thickness of 100 μm. As a result, a small amount of the diamond crystal seeds disappeared, but grown diamond crystals had a good quality with the well-grown surface and a uniform size distribution as in Example 1. The total amount of the resultant diamond grains was 2.3 g.

When Example 1 was repeated except that the second solvent metal plate had the thickness of 200 μm, most of the diamond crystal seeds disappeared and no good diamond grains was produced.

EXAMPLE 3

Example 1 was repeated except that the second solvent metal plate having the thickness of 100 μm and the diameter of 22 mm was of a carburized Fe-42Ni alloy. The carburized alloy was produced by heating the Fe-42Ni alloy plate and the graphite plate which was contacted with the alloy plate at 1000° C. for 3 hours in a vacuum atmosphere. A carbon content of the carburized alloy was 0.32% by weight.

The disappearance of the diamond crystal seeds was not observed and the resultant diamond grains had substantially the same quality as in Example 1 and the total weight of the produced diamond grains was 3.6 g.

EXAMPLE 4

Example 1 was repeated except that the fist solvent metal plate and the second solvent metal plate were made of a Fe-50Co alloy. The yield, the size distribution and the quality of the resultant diamond grains were substantially the same as in Example 1.

In addition, when Example 1 was repeated except that the fist solvent metal plate and the second solvent metal plate were made of a Fe-50Co alloy containing 0.3% by weight of carbon produced by mixing the Fe-50Co alloy with carbon powder and sintering them. The yield, the distribution of the size and the quality of the resultant diamond grains were substantially the same as in Example 1.

According to the present invention, it is possible, in the stacking process using the diamond crystal seeds, to reduce the inclusion in the growing diamond crystal and to suppress the spontaneous nucleation, so that the diamond abrasive grains having the good quality including the narrower size distribution (mainly in the size of 200–850 μm), the high toughness and the high strength are produced in the high yield.

What is claimed is:

1. A process for the production of diamond abrasive grains comprising steps of:
    regularly arranging a plurality of diamond crystal seeds on a first solvent metal plate, stacking a second solvent metal plate on the first solvent metal plate so that the diamond crystal seeds are sandwiched by the first solvent metal plate and the second solvent metal plate wherein said plate is providing a source of carbon and stacking a graphite raw plate on the second solvent metal plate to construct a production system for the diamond abrasive grains,
    heating the system or heating the system with pressurizing to a temperature above a solvent metal-graphite eutectic point through a temperature and pressure condition in which diamond is thermodynamically unstable to establish a temperature and pressure condition in which diamond is thermodynamically unstable,
    heating the system or heating the system with pressurizing to establish a temperature and pressure condition in which diamond is thermodynamically stable and maintaining said condition, and
    recovering said diamond abrasive grain.

2. The process, according to claim 1 in which the first solvent metal plate and the second solvent metal plate comprise at least one of Fe, Ni, Co and Mn and at least second solvent metal plate has a thickness of 50–150 μm.

3. The process according to claim 1 in which the first solvent metal plate and the second solvent metal plate comprise at least one of Fe, Ni, Co and Mn and at least one of the first solvent metal plate and the second solvent metal plate contains carbon of not less than 0.2% by weight.

4. The process according to claim 3 in which the solvent metal plate which contains carbon has a thickness of 50-200 μm.

5. The process according to claim 1 in which the diamond crystal seeds have a size of 20-150 μm.

6. The process according to claim 1 in which, in order to ensure the regular arrangement of the diamond crystal seeds, a solution comprising an acrylic copolymer as a main component is applied on the first solvent metal plate beforehand, the diamond crystal seeds are regularly arranged on the first solvent metal plate, and the acrylic copolymer is decomposed by heating in a vacuum condition to form solid carbon which bonds the diamond crystal seeds firmly to the first solvent metal plate.

* * * * *